United States Statutory Invention Registration [19]

[11] Reg. Number: H224

Malik et al. [43] Published: Mar. 3, 1987

[54] GLYCOSIDE-CONTAINING AGRICULTURAL TREATMENT COMPOSITION

[75] Inventors: Arshad H. Malik, Decatur, Ill.; Arno Cahn, Pearl River, N.Y.

[73] Assignee: A. E. Staley Manufacturing Company, Decatur, Ill.

[21] Appl. No.: 739,241

[22] Filed: May 30, 1985

[51] Int. Cl.[4] ..... A01N 43/54; A01N 37/50; A01N 57/12; A01N 43/78

[52] U.S. Cl. ..... 71/92; 71/DIG. 1; 71/79; 71/111; 514/136; 514/367; 514/617

[58] Field of Search ..... 71/DIG. 1, 86, 92, 111

[56] References Cited

U.S. PATENT DOCUMENTS

| | | | |
|---|---|---|---|
| 3,219,656 | 11/1965 | Boettner | 536/18.3 |
| 3,598,865 | 8/1971 | Lew | 536/4.1 |
| 4,242,120 | 12/1980 | Manankov | 71/DIG. 1 |
| 4,512,989 | 4/1985 | Ohyama et al. | 514/383 |

OTHER PUBLICATIONS

Schoenbeck et al, "Preformed Substances, etc.," (1976) CA 87:180607f (1977)

Chararas, "Phytochemical Relationships, etc.," (1980) CA 94:27777m (1981).

*Primary Examiner*—John F. Terapane
*Assistant Examiner*—Matthew A. Thexton
*Attorney, Agent, or Firm*—Forrest L. Collins

[57] ABSTRACT

This invention describes a composition of matter and a method of treating agricultural substrates in which an active ingredient selected from the group consisting of fungicides, bactericides, insecticides, insect repellents, herbicides and plant growth regulators and mixtures thereof is utilized in conjunction with an amount of a glycoside dispersing agent selected from the group consisting of fructoside, glucoside, mannoside, galactoside, taloside, guloside, alloside, altroside, idoside, arabinoside, xyloside, lyxoside and riboside and mixtures thereof which is sufficient to form an emulsion or dispersion of the active ingredient.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GLYCOSIDE-CONTAINING AGRICULTURAL TREATMENT COMPOSITION

BACKGROUND OF THE INVENTION

1. Field of the Invention

This invention deals with the forming of dispersions or emulsions and dry product application of various biologically active ingredients.

2. Description of the Art

It is known that various materials such as insecticides, insect repellents, fungicides, bactericides, herbicides, and plant growth regulators may formulated into various products for use on crops, for insect control, weed control and the like. Often, these products are applied as a dry powder or a granular material to the surface which is desired to be treated. In still other cases, the products are formulated as a liquid or a semi-solid dispersion. Whether the method of application is dry or wet, it is advantageous to include within the product a dispersing agent to control the flow of the product to ensure equal distribution of the active ingredient throughout the remaining components of the composition.

The typical composition used for herbicide, fungicide, insecticide, bactericide or herbicide ingredients has ordinarily depended on the end-use method of application. That is, a specific dispersing aid is often employed when the product is to be applied in a powder or dry form and yet a second different dispersing aid is required when the product is to be applied as a semi-solid or liquid composition. It would be advantageous to prepare a product comprising the active ingredient and to utilize a single dispersing agent without regard to whether the final use application of the product is in a liquid or solid formulation. Moreover, the desirability of using a single ingredient as a dispersing agent reduces the possibility for error given the number of chemicals which must be compounded to prepare a herbicide or insecticide product.

It is also highly desirable to incorporate into the compositions with which the present invention deals, a dispersing aid which is not itself environmentally harmful either to the products to which it is applied or to the applicator of the composition. It is also desirable that the dispersing aid aspect of the present invention use a material which has emulsifying characteristics as well as being useful in dispersing the product in its application. It is also desirable to replace materials such as Cellosolve solvents typically used in numerous agricultural formulations. The Cellosolve solvents have been speculated to be carcinogenic materials which may also cause sterility. The particular dispersing agents with which the present invention is concerned have considerably less volatility than do the Cellosolve materials and thus may be retained for longer periods on plants or other surfaces on which the composition is applied. The emulsifying and dispersing capabilities of the dispersing agents of the present invention also make them less resistant to being removed by rain from the surface of a growing plant. The reader is suggested to review U.S. Pat. No. 4,512,989 issued Apr. 23, 1985 to Ohyama et al. for a general disclosure of agricultural compositions with which the present invention is concerned.

Throughout the specification and claims, percentages and ratios are by weight; temperatures are in degrees Celsius and pressures are in KPascals unless otherwise indicated. To the extent applicable, references to patents and articles are herein incorporated by reference.

SUMMARY OF THE INVENTION

This invention describes composition of matter comprising an active ingredient consisting of fungicides; bactericides; insecticides; insect repellents; herbicides and plant growth regulators and mixtures thereof and an effective amount of a glycoside dispersing agent selected from the group consisting of fructoside, glucoside, mannoside, galactoside, taloside, guloside, alloside, altroside, idoside, arabinoside, xyloside, lyxoside and riboside and mixtures thereof in a sufficient amount to form an emulsion or dispersion of the active ingredient.

A further aspect of the invention is a method of treatment an agricultural substrate comprising introducing to the substrate a sufficient amount to accomplish the treatment of a composition of matter comprising an active ingredient consisting of fungicides; bactericides; insecticides; herbicides and plant growth regulators and mixtures thereof and an effective amount of a glycoside dispersing agent selected from the group consisting of fructoside, glucoside, mannoside, galactoside, taloside, guloside, alloside, altroside, idoside, arabinoside, xyloside, lyxoside and riboside and mixtures thereof in a sufficient amount to form an emulsion or dispersion of the active ingredient.

DETAILED DESCRIPTION OF THE INVENTION

Glycosides useful in the present invention include those prepared according to U.S. Pat. No. 3,219,656 to Boettner issued Nov. 23, 1965. Further glycosides which may be used herein include the alkyl polyglycosides described in U.S. Pat. No. 3,598,865 issued Aug. 10, 1971 to Lew. Useful saccharide moieties for the glycoside include fructosides, glucosides, mannosides, galactosides, talosides, gulosides, allosides, altrosides, idosides, arabinosides, xylosides, lyxosides and ribosides and mixtures thereof. The preferred sacchride moieties are glucosides, fructosides and xylosides.

The structural formula $R(OG)_x$ as defined herein preferably has the hydrophobic moiety (aglycone portion) of the glycoside containing between about 1 and 30 carbon atoms; preferably from about 1 to about 20 carbon atoms; and most preferably from about 9 to about 18 carbon atoms. In formulations where it is desired to prepare the product as a powdered or polverant material the aglycone portion preferably contains from about 1 to about 8 carbon atoms and in particular is a 2-ethylhexyl radical or other branched material.

The value O is an oxygen atom in the structural formula while the value x is referred to as the degree of polymerization or DP indicating the number of sacchraide units in the glycosyl portion of the molecule. Typically, the degree of polymerization on average will be between 1 and about 18; preferably from about 1 to about 15; and most preferably from about 1.2 to about 4. Where a powdered or polverant product is preferred it is often desired to utilize the material where the DP is substantially 1. The saccharide backbone (glycosyl) as defined herein is the portion (G) of the molecule.

Where desired in the present invention the glycosides may contain an alkylene oxide unit such as propylene oxide or ethylene oxide between the hydrophobic moiety (aglycone portion) of the glycoside molecule and the saccharide backbone.

Where it is also desirable, the glycoside may contain pendant alkylene oxide units such as ethylene propylene oxide. A disclosure of the manufacture of such glycosides is found in Ser. No. 06/704,828 filed Feb. 25, 1985 by Roth et al. and herein incorporated by reference. As noted previously, the scope of the present invention is particularly broad based in that glycoside materials over a wide range of values according to the structural formula $R(OG)_x$ are useful. It is believed that the lower DP, lower alkyl chain-length materials tend to be rather water insoluble and thus excellent for incorporation in powdered or polverant products whereas the higher DP materials are valuable in that they have substantial emulsification capacity to function as a dispersing agent in the present invention. Generally, as the number of carbon atoms in the aglycone portion of the molecule increases the product becomes less water-soluble, thereby holding the active ingredient on the plant surface.

The active ingredients in the present invention are as follows:

FUNGICIDES AND BACTERICIDES

Carbamate fungicides such as 3,3'-ethylenebis (tetrahydro-4,6-dimethyl-2H-1,3,5-thiadiazine-2-thione), zinc or manganese ethylenebis(dithicarbamate), bis(-dimethyldithiocarbamoyl)disulfide, zinc propylenebis (dithiocarbamate), bis(dimethyldithiocarbamoyl) ethylenediamine; nickel dimethyldithiocarbamate, methyl-1(butylcarbamoyl)-2-benzimidazolecarbamate, 1,2-bis(3-methoxycarbonyl-2-thioureido)benzene, 1-isopropylcarbamoyl-3-(3,5-dichlorophenyl)hydration, potassium N-hydroxymethyl-N-methyldithiocarbamate and 5-methyl-10-butoxycarbonylamino-10, 11-dehydrodibenzo (b,f)azepine; pyridine fungicides such as zinc bis(2-hydroxy-2-(1H)pyridinethionate) and 2-pyridinethiol-1-oxide sodium salt; phosphorus fungicides such as 0,0-diisopropyl S-benzylphosphorothioate and 0-ethyl S,S-diphenyldithiophosphate; phthalmide fungicides such as N-(2,6-p-diethylphenyl)phthalimide and N-(2,6-diethylphenyl)-4-methylphthalimide; dicarboxyimide fungicides such as N-trichloromethylthio 4-cyclohexene-1,2-dicarboxyimide and N-tetrachloroethylthio-4-cyclohexene-1,2-dicarboxyimide; oxathine fungicides such as 5,6-dihydro-2-methyl-1,4-oxathine-3-carboxanilido-4,4-dioxide and 5,6-dihydro-2-methyl-1,4-oxathine-3-carboxanilide; naphthoquinone fungicides such as 2,3-dichloro-1,4-napththoquinone, 2-oxy-3-chloro-1,4-naphthoquinone copper sulfate; pentachloronitrobenzene; 1,4-dichloro-2,5-dimethoxybenzene; 5-methyl-s-triazol(3,4-b)benzthiazole; 2-(thiocyanomethylthio)benzothiazole; 3-hydroxy-5-methylisooxazole; N-2,3-dichlorophenyltetrachlorophthalamic acid; 5-ethoxy-3-trichloromethyl-1,2,4-thiadiazole; 2,4-dichloro-6-(0-chloroanilino)-1,3,5-triazine; 2,3-dicyano-1,4-dithioanthraquinone; copper 8-quinolinate; polyoxine; validamycin; cycloheximide; iron methanearsonate; diisopropyl 1,3-dithiolane-2-iridene malonate; 3-allyloxy-1,2-benzoisothiazol-1,1-dioxide; kasugamycin; Blasticidin S; 4,5,6,7-tetrachlorophthalide; 3-(3,5-dichlorophenyl)5-ethenyl-5-methyloxazolizine-2,4-dione; N-(3,5-dichlorophenyl)-1,2-dimethylcyclopropane-1,2-dicarboxyimide; S-n-buty-5'-para-t-butylbenzyl-N-3-pyridyldithiocarbonylimidate; 4-chlorophenoxy-3,3-dimethyl-1-(1H,1,3,4-triazol-1-yl)-2-butanone; methyl-D,L-N-(2,6-dimethylphenyl)-N-(N'-methoxyacetyl)alaninate; N-propyl-N-[2-(2,4,6-trichlorophenoxy)ethyl]imidazol-1- carboxamide; N-(3,5-dichlorophenyl)succinamide; tetrachloroisophthalonitrile; 2-dimethylamino-4-methyl-5-n-butyl-6-hydroxypyrimidine; 2,6-dichloro-4-nitroaniline; 3-methyl-4-chlorobenzthiazol-2-one; 1,2,5,6-tetrahydro-4H-pyrrolol[3,2,1-i,j]quinoline-2-one; 3'-isopropoxy-2-methylbenzanilide; 1-[2-(2,4-dichlorophenyl)-4-ethyl-1-3-dioxorane-2-ylmethyl)hyl]-1H,1,2,4-triazol; 1,2-benzisothiazoline-3-one; basic copper chloride; basic copper sulfate; N'-dichlorofluoromethylthio-N,N-dimethyl-N-phenyl sulfamide; ethyl-N-(3-dimethylaminopropyl)thiocarbamate hydrochloride; piomycin; S,S-6-methylquinoxaline-2,3di-yldithiocarbonate; complex of zinc and manneb; di-zinc bis(dimethyldithiocarbamate)ethylenebis (dithicarbamate).

PLANT GROWTH REGULATORS AND HERBICIDES

Isourea plant growth regulators such as N-methoxycarbonyl-N'-methylphenylcarbamoylethylisourea and 1-(4-chlorophenylcarbamoyl)-3-ethoxycarbonyl-2-methylisourea; another type of plant growth regulators such as sodium naphthaleneacetate, 1,2-dihydropyridazine-3,-6-dione and gibberellins; triazine herbicides such as 2-methylthio-4,6-bisethylamino-1,3,5-triazine, 2-chloro-4,6-bisethylamino-1,3,5-triazine, 2-methoxy-4-ethylamino-6-isopropylamino-1,3,5-triazine, 2-chloro-4-ethylamino-6-isopropylamino-s-triazine, 2-methylthio-4,6-bis(isopropylamino)-S-triazine and 2-methylthio-4-ethylamino-6-isopropylamino-s-triazine; phenoxy herbicides such as 2,4-dichlorophenoxyacetic acid and methyl, ethyl, and butyl esters thereof. 2-chloro-4-methylphenoxyacetic acid, 4-chloro-2-methylphenoxyacetic acid and ethyl 2-methyl-4-chlorophenoxybutylate; diphenylether herbicides such as 2,4,6-trichlorophenyl-4'-nitrophenylether,2,4-dichlorophenyl-4'-nitrophenylether and 3,5-dimethylphenyl-4'-nitrophenylether; urea herbicides such as 3-(3,4-dichlorophenyl)-1-methoxy-1-methyl urea, 3-(3,4-dichlorophenyl)-1,1-dimethylurea and 3-(4-chlorophenyl)-1,1-dimethyl urea; carbamate herbicides such as 3-methoxycarbonylaminophenyl-N-(3-methylphenyl)carbamate, isopropyl-N-(3-chlorophenyl)carbamate and methyl-N-(3,4'-dichlorophenyl)carbamate; uracil herbicides such as 5-bromo-3-sec-butyl-6-methyluracil and 1-cyclohexyl-3,5-propyleneuracil; thiolcarbamate herbicides such as S-(4-chlorobenzyl)-N,N-diethylthiolcarbamate,S-ethyl-N-cyclohexyl-N-ethylthiolcarbamate and S-ethyl-hexahydro-1H-azepine-1-carbothioate and S-ethyl-N,N-di-n-propylthiocarbamate; pyridium herbicides such as 1,1'-di-methyl-4,4'-bispyridinium dichloride; phosphoric herbicides such as N-(phosphonomethyl)glycine; aniline herbicides such as alpha, alpha, alpha-trifluoro-2,6-dinitro-N,N-dipropyl-p-toluidine, 4-(methylsulfonyl)-2,6-dinitro-N,N-dipropylaniline and K<3>, N<3>-diethyl-2,4-dinitro-6-trifluoromethyl-1,3, -phenylene diamine; acid anilide herbicides such as 2-chloro-2',6'-diethyl-N-(butoxymethyl)acetoanilide, 2-chloro-2',6'-diethyl-N-(methoxymethyl)acetoanilide, and 3,4-dichloropropioneanilide; pyrazole herbicides such as 1,3-dimethyl-4-(2,4-dichlorobenzoyl)-5-hydroxypyrazole and 1,3-di-methyl-4-(2,4-dichlorobenzoyl)-5-(p-toluenesulfonyloxy)pyrazole; 5-tert-butyl-3-(2,4-dichloro-5-isopropoxyphenyl)-1,3,4-oxadiazoline-2-one; 2-[N-isopropyl,N-(4-chlorophenyl)carbamoyl]-4-chloro-5methyl-4-isooxazoline-3-one; 3-isopropylbenzo-2-thia-1,3-diazinone-(4-2,4-dioxide and 3-(2-methylphenoxy)pyridazine.

INSECTICIDES

Phosphoric insecticides such as 0,0-diethyl O-(2-isopropyl-4-methyl-6-pyrimidinyl)phosphorothioate, 0,0-diethyl S-2-[(ethylthio)ethyl]phosphorodithioate, 0,0-dimethyl 0-(3-methyl-4-nitrophenyl)thiophosphate, 0,0-dimethyl S-(N-methylcarbamoylmethyl)phosphorodithioate, 0,0-dimethyl S-(N-methyl-N-formylcarbamoylmethyl)phosphorodithioate, 0,0-dimethyl S-2-[(ethylthio)ethyl]phosphorodithioate, 0,0-diethyl S-2-diethyl S-2-[(ethylthio)-ethyl]phosphorodithioate, 0,0-dimethyl-1-hydroxy-2,2,2-trichloroethylphosphonate, 0,0-diethyl-0-(5-phenyl-3-isooxazolyl)phosphorothioate, 0,0-dimethyl 0-(2,5-dichloro-4-bromophenyl)phosphorothioate, 0,0-dimethyl 0-(3-methyl-4-methylmercaptophenyl)thiophosphate, 0-ethyl 0-p-cyanophenyl phenylphosphorothioate,0,0-dimethyl-S-(1,2-dicarboethoxyethyl)phosphorodithioate, 2-chloro-(2,4,5-trichlorophenyl)vinyldimethyl phosphate, 2-chloro-1-(2,4-dichlorophenyl)vinyldimethyl phosphate, 0,0-dimethyl 0-p-cyanophenyl phosphorothioate, 2,2-dichlorovinyl dimethyl phosphate, 0,0-diethyl 0-2,4-dichlorophenyl phosphorothioate, ethyl mercaptophenylacetate 0,0-dimethyl phosphorodithioate, S-[(6-chloro-2-oxo-3-benzooxazolinyl)methyl]0,0-diethyl phosphorodithioate, 2-chloro-1-(2,4-dichlorophenyl)vinyl diethylphosphate 0,0-diethyl 0-(3-oxo-2-phenyl-2H-pyridazine-6-yl)phosphorothioate, 0,0-dimethyl S-(1-methyl-2-ethylsulfinyl)-ethyl phosphorothiolate, 0,0-dimethyl S-phthalimidomethyl phosphorodithioate, 0,0-diethyl 2,2,2-trichloroethanol, 2-(p-tert-butylphenoxy)isopropyl-2'-chloroethylsulfite, azoxybenzene, di-(p-chlorophenyl)-cyclopropyl carbinol, di[tri(2,2-dimethyl-2-phenylethyl)tin]oxide, 1-(4-chlorophenyl)-3-(2,6-difluorobenzoyl)urea and S-tricyclohexyltin 0,0-diisopropylphosphorodithioate.

INSECT REPELLENTS

The following insect repellents may be employed herein: 2-ethyl-1,3-hexanediol; N-octyl bicycloheptene dicarboximide; N,N-diethyl-M-toluamide; 2,3:4,5-Bis (2-butylene) tetrahydro-2-furaldehyde; Di-n-propyl isocinchomeronate; and 2-hydroxyethyl-n-octyl sulfide.

The active ingredients in the present invention are typically formulated so as to be present in the composition at from about 0.0001 percent to about 10 percent by weight; preferably from about 0.0005 percent to about 8 percent by weight. The end usage level of the products is therefore dependent upon the amount of the compositions of the present invention. It is thus within the skill of the applicator to determine the specific amount of active ingredient to be used in any particular application.

It is anticipated that the active ingredients herein will be utilized in their normal use level or slightly lower levels due to the enhanced effectiveness of the compositions of the present invention. The glycosides in the present invention will be utilized in the composition typically at from about 0.1 to about 20 percent; preferably from about 0.5 percent to about 10 percent by weight of the composition.

All matter of other adjuvants, powders, bulking agents and the like may be utilized in the present invention including dyes, foaming agents and additional solvents where required. Most typically, the compositions of the present invention will contain from about 5 percent to about 95 percent; preferably from about 10 percent to about 95 percent by weight water. Additional solvents may be added by the applicator to dilute out the composition. Of course, the products of the present invention may be formulated as aqueous products ready for use if desired. The products may be applied by aerial spraying, by in seed row application or with a fertilizer or the like.

The following is a suggested exemplification of the present invention.

EXAMPLE I

Wettable Powder 20 parts of 5-bromo-3-sec-butyl-6-methyluracil, 5 parts of lauryl glucoside (DP 2 average), 3 parts of calcium lignosulfonate and 72 parts of diatomaceous earth are mixed together and ground uniformly to give a wettable powder containing 20 percent by weight of the active ingredient compound.

EXAMPLE II 30 parts of 2,2-dichlorovinyl dimethyl phosphate, 50 parts of xylene and 20 parts of nonyl xyloside (DP 1.5 average) are mixed together to make a uniform solution, affording an emulsifiable concentrate containing 30 percent by weight of the active ingredient compound.

EXAMPLE III

Oily Formulation 50 parts of 3-methyl-4-chlorobenzthiazol-2-one and 50 parts of myristyl glucoside (DP 2.2 average) are mixed together to make a uniform mixture, affording an oily formulation containing 50 percent by weight of the active ingredient compound.

EXAMPLE IV

Sol (Flowable Powder)

40 parts of finely divided N-methoxycarbonyl-N'-4-methylphenylcarbamoylethylisourea having average particle size of not more than 10 microns, 4 parts of 2-ethylhexyl monoglucoside, 1 part of hydroxypropylcellulose and 55 parts of water are mixed together uniformly to give a sol containing 40 percent by weight of the active ingredient compound.

EXAMPLE V

An insect repellent is prepared containing 1 part N,N-Diethyl-M-toluamide; 5 parts cetyl glucoside DP 2 average; and 94 parts octyl alcohol.

What is claimed is:

1. A composition of matter comprising a plant growth regulator and an effective amount of a glycoside dispersing agent selected from the group consisting of fructoside, glucoside, mannoside, galactoside, taloside, guloside, alloside, altroside, idoside, arabinoside, xyloside, lyxoside and riboside and mixtures thereof in a sufficient amount to form an emulsion or dispersion of the active ingredient, said glycoside dispersing agent consisting essentially of glycosides corresponding to the formula:

$$R(OG)_x$$

wherein R contains from 1 to 8 carbon atoms; O is an oxygen atom; x has an average value of from 1 to about 18; and G is the glycosyl portion of said glycoside dispersing agent.

2. The composition of claim 1 wherein G is glucoside.

3. The composition of claim 1 wherein x averages from about 1 to about 15.

4. The composition of claim 5 wherein x averages from about 1.2 to about 4.

5. The composition of claim 1 wherein x is 1.

6. The composition of claim 1 wherein G is glucose; and x is 1.

7. The composition of claim 1 wherein R is a branched alkyl moiety.

8. The composition of claim 1 wherein the active ingredient is present in the composition at from about 0.0001 percent to about 30 percent by weight.

9. The composition of claim 1 containing from about 20 percent to about 95 percent by weight of water.

10. The composition of claim 1 containing from about 0.1 percent to about 30 percent by weight of the glycoside.

11. The composition of claim 1 wherein R is a 2-ethylhexyl radical.

12. The composition of claim 11 wherein G is glucose.

13. The composition of claim 12 wherein x averages from about 1.2 to about 4.

14. The composition of claim 1 wherein the glycoside dispersing agent is 2-ethylhexyl monoglucoside.

15. The composition of claim 1 wherein the plant growth regulator is a herbicide.

* * * * *